W. N. Berkeley,
Horse Power.

No. 96,192.    Patented Oct. 26, 1869.

WITNESSES:    INVENTOR:

United States Patent Office.

WILLIAM N. BERKELEY, OF CEDAR RAPIDS, IOWA.

Letters Patent No. 96,192, dated October 26, 1869.

HORSE-POWER.

The Schedule referred to in these Letters Patent and making part of the same.

*To all whom it may concern:*

Be it known that I, WILLIAM N. BERKELEY, of Cedar Rapids, in the county of Linn, and State of Iowa, have invented a new and useful "Improvement in Horse-Powers;" and I do hereby declare the following to be a full, clear, and exact description of the same, reference being had to the accompanying drawing, and the letters and figures marked thereon, which form a part of this specification, and in which—

Figure 1:
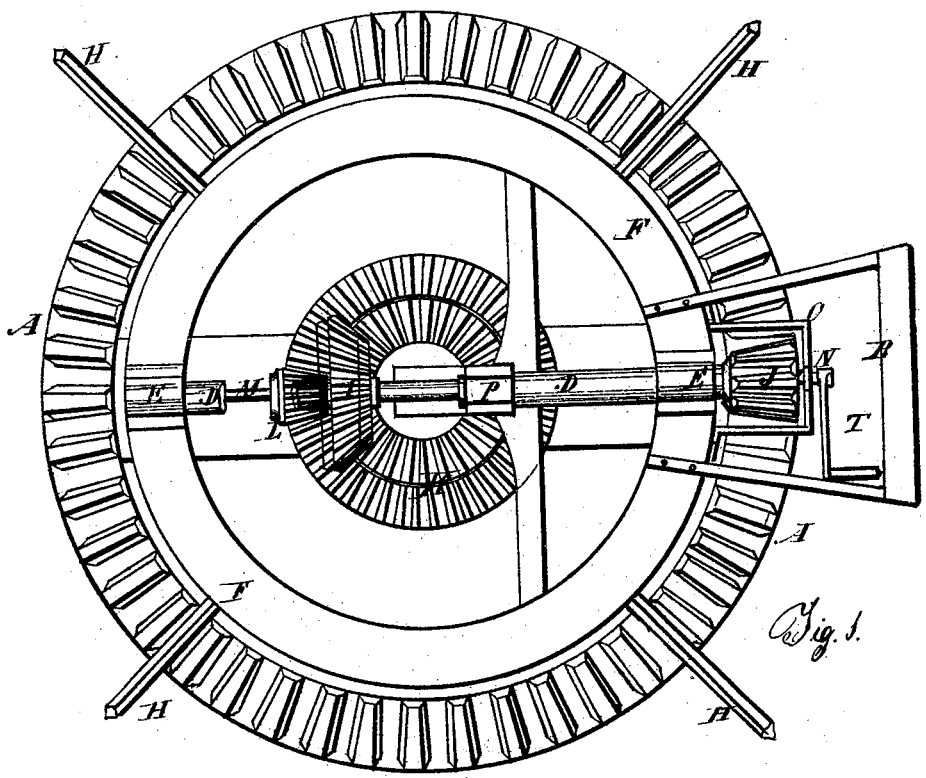

Figure 1 represents a top or plan view of my horse-power; and

Figure 2:
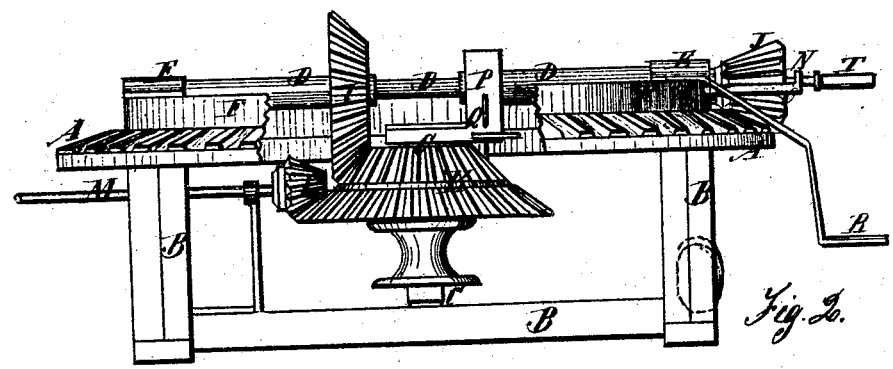

Figure 2, a side elevation, with a part of the side broken away to show the centre of the machine.

The nature of my invention consists in the special combination of the bevel-gear, hereafter fully described, in which the drive-wheel moves with the shaft, and revolves on the shaft, thereby increasing the speed of the machinery driven; and It further consists in the special combination, hereafter fully described, for changing the horse-power to a man-power.

I use the ordinary circular rack A, supported upon the frame B, with a centre-post, C.

There is also a shaft, D, which has bearings, E, on the wheel F, the draught-levers H being attached to the wheel F.

The bevel drive-wheel I is so attached to the shaft D as to revolve with it, as is also the wheel J.

The horses, being hitched to the draught-levers H, by travelling around, revolve the wheel F, carrying the shaft D with it; but as the shaft D moves with the wheel F, the wheel J, either by friction or by cogs, is caused to revolve by coming in contact with the rack A, and revolves or drives the shaft D.

The drive-wheel I, being on the shaft D, travels around with it, and, at the same time, drives the bevel-wheel K, which revolves on the centre-post or spindle C.

The motion of the drive-wheel I, it being placed on the shaft D, more than one-half its length from its driving-wheel J, causes it to communicate greater speed to the wheel K than it would if it did not move around as it revolves, and greater than it would if it were placed on the shaft D, between its centre and the wheel J, for then it would travel with its revolving motion instead of against it.

The wheel K drives the pinion L on the tumbling-rod M of the horse-power.

By the above arrangement of the drive-wheel I on the shaft D, greater speed is communicated to the tumbling-rod of the horse-power, without any increase of power.

To relieve the boxes E of pressure, and to steady and strengthen the shaft D where the power is applied to it, I brace it, by the bearing N, in the brace-strap O, that is attached to the wheel F, as clearly shown in fig. 1, so as to move around with it.

There is also a bearing, P, for the shaft D, in the crank Q. The crank Q, resting on the centre-post or spindle C, revolves thereon as the shaft D is carried around with the wheel or frame F.

This crank-bearing serves two purposes. It makes a support and guide for the shaft D, and also, by putting a pin through the slot S directly into the wheel K, and throwing the drive-wheel I out of gear, as indicated by the blue lines in fig. 1, it communicates motion directly from the shaft D to the wheel K, the shaft D acting simply as a lever to turn the wheel K.

This change is made when it is desired to use hand-power, which is applied by a man standing upon the platform R, and turning the crank T. This connection makes a slow motion, but such an increase of power as to enable one man to run the machine.

In the construction of my improved horse-power, I use cogs, as shown in the drawings, or the power may be communicated by friction.

Having fully described the construction and operation of my improved machine,

What I claim, and desire to secure by Letters Patent, is—

1. The revolving wheel or frame F, the shaft D, the drive-wheel I, crank-shaped bearing Q, and wheel K, when constructed, combined, and operating with a rack, A, and cog-wheel J, (or equivalents,) as a horse-power, substantially as set forth.

2. The wheel or frame F, shaft D, crank-shaped bearing Q, wheel K, and crank T, when constructed, combined, and operating with a rack, A, and cog-wheel J, (or equivalents,) as a man-power, substantially as described and shown.

3. The brace-strap O, provided with a bearing for the shaft D, and constructed and arranged so as to operate substantially as described and shown.

WILLIAM N. BERKELEY.

Witnesses:
L. L. COBURN,
HEINR. BRUNS.